(12) United States Patent
Sampath et al.

(10) Patent No.: US 8,743,784 B2
(45) Date of Patent: Jun. 3, 2014

(54) VHT-SIG-B FIELD IN NULL DATA PACKETS (NDPS)

(75) Inventors: Hemanth Sampath, San Diego, CA (US); Vincent Knowles Jones, IV, Redwood City, CA (US); Albert Van Zelst, Woerden (NL); Maarten Menzo Wentink, Naarden (NL); Santosh Paul Abraham, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 13/197,600

(22) Filed: Aug. 3, 2011

(65) Prior Publication Data

US 2012/0033614 A1 Feb. 9, 2012

Related U.S. Application Data

(60) Provisional application No. 61/370,715, filed on Aug. 4, 2010, provisional application No. 61/390,101, filed on Oct. 5, 2010.

(51) Int. Cl.
*H04J 11/00* (2006.01)
*H04B 7/00* (2006.01)
*H04W 4/00* (2009.01)
*H04J 3/00* (2006.01)

(52) U.S. Cl.
USPC ........... 370/328; 370/203; 370/310; 370/334; 370/464

(58) Field of Classification Search
None
See application file for complete search history.

(56) References Cited

U.S. PATENT DOCUMENTS

| 5,331,634 | A  | * | 7/1994  | Fischer ............................ 370/405 |
| 2007/0223365 | A1 | * | 9/2007  | Tsfaty et al. ..................... 370/208 |
| 2007/0298742 | A1 |   | 12/2007 | Ketchum et al. |
| 2010/0238860 | A1 | * | 9/2010  | Ota ................................. 370/328 |
| 2010/0260138 | A1 |   | 10/2010 | Liu et al. |
| 2010/0260159 | A1 | * | 10/2010 | Zhang et al. ..................... 370/338 |

(Continued)

FOREIGN PATENT DOCUMENTS

| JP | 2007537655 A | 12/2007 |
| JP | 4286868 B2   | 7/2009  |

(Continued)

OTHER PUBLICATIONS

Stacey, Robert et al.: "IEEE P802.11-09/0992R13—Specification Framework for TGac", IEEE802. Wireless Lans, [Online] Jul. 15, 2010, pp. 1-20, Retrieved from the Internet: URL:https://mentor.ieee.org/802.11/dcn/09/11-09-0992-13-00ac-proposed-specification-framework-for-tgac.com[retrieved on Nov. 7, 2011].

(Continued)

*Primary Examiner* — Hassan Phillips
*Assistant Examiner* — Lonnie Sweet
(74) *Attorney, Agent, or Firm* — Patterson & Sheridan, L.L.P.

(57) ABSTRACT

Certain aspects of the present disclosure relate to methods and apparatus for using information in a Very High Throughput Signal B (VHT-SIG-B) field in the preamble of a null data packet (NDP). Retaining the VHT-SIG-B field in NDPs offers several advantages, such as maintaining a unified IEEE 802.11ac preamble structure, providing for 4 μs extra time to process beamforming feedback, and being able to use information in the VHT-SIG-B field to determine a level of interference in the NDP.

18 Claims, 6 Drawing Sheets

(56) References Cited

U.S. PATENT DOCUMENTS

| | | | |
|---|---|---|---|
| 2011/0002219 A1* | 1/2011 | Kim et al. | 370/203 |
| 2011/0116488 A1 | 5/2011 | Grandhi | |
| 2011/0128947 A1 | 6/2011 | Liu et al. | |
| 2011/0149882 A1* | 6/2011 | Gong et al. | 370/329 |
| 2011/0176420 A1 | 7/2011 | Shiotsuki et al. | |

FOREIGN PATENT DOCUMENTS

| | | | |
|---|---|---|---|
| WO | WO-2005112355 A1 | 11/2005 | |
| WO | WO-2006013858 A1 | 2/2006 | |
| WO | WO-2008002972 A2 | 1/2008 | |
| WO | WO-2009132143 A1 | 10/2009 | |
| WO | WO-2010023890 A1 | 3/2010 | |

OTHER PUBLICATIONS

Van Zelst, Allert: "VHT-SIG-B in NDPs", IEEE 802.1-10/1290R0, Nov. 2, 2010, pp. 1-7, XPOO2662888, Retrieved from the Internet: URL:http://www.google.nl/url?sa_t&rct=j&q=10%2F1290r0&source=https%3A%2F%mentor.ieee.org%2F802.11%2Fdcn%F10%@F11-1—1290-00-00ac-vht-sig-b-in-ndps.ppt&ei=5tq3TqPrA4Wh0tDh90MB&usg=AFQjCNEm6_k0sREKwMQtXfWkdhh2WJj42w&cad=rja [retrieved on Nov. 7, 2011] the whole document.

Stacey, Robert et al.: "IEEE P802.11-09/0992R15—Specification Framework for TGac", IEEE P802.11 Wireless Lans, Sep. 16, 2010, pp. 1-27, XP00262889, Retrieved from the internet: URL:https://mentor.ieee.org/802.11/dcn/09/framework-for-tgac.doc [retrieved on Nov. 7, 2011] paragraph [R3.2.5.B].

International Search Report and Written Opinion for PCT/US2011/046654, dated Nov. 17, 2011.

Robert Stacey, "TGas Spec Framework," IEEE 802.11 11-09/0992r18, Wireless LANS (Sep. 2010), 40 pgs.

Albert Van Zelst, "VHT-SIG-B in NDPs," IEEE 802.11 11-10/1290r0 (Nov. 2010), 7 pgs.

Erceg V et al., "Sounding and P matrix Proposal", IEEE 802.11-10/0566R2, May 16, 2010, pp. 1-14, XP002658367, Retrieved from the Internet: URL:https://mentor.ieee.org/802.11/documents? n=22 &is_dcn_09801146&is_year=2010 [retrieved on Sep. 7, 2011].

Examination Report dated Nov. 6, 2013, issued by the European Patent Office in corresponding Application No. 11 751 699.7-1505.

* cited by examiner

VHT-SIG-B FIELD IN NULL DATA PACKETS (NDPS)

CROSS-REFERENCE TO RELATED APPLICATIONS

This application claims benefit of U.S. Provisional Patent Application Ser. No. 61/370,715, entitled "VHT-SIGB FIELD IN NULL DATA PACKETS (NDPs)" and filed Aug. 4, 2010, and U.S. Provisional Patent Application Ser. No. 61/390,101, entitled "VHT-SIGB FIELD IN NULL DATA PACKETS (NDPs)" and filed Oct. 5, 2010, both of which are herein incorporated by reference.

BACKGROUND

1. Field

Certain aspects of the present disclosure generally relate to wireless communications and, more particularly, to using information in a Very High Throughput Signal B (VHT-SIG-B) field in the preamble of a null data packet (NDP).

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method for wireless communications. The method generally includes transmitting a non-null data packet having a preamble with a Very High Throughput Signal B (VHT-SIG-B) field, generating a null data packet (NDP), wherein the VHT-SIG-B field of the preamble of the NDP comprises information, and transmitting the NDP.

Certain aspects of the present disclosure provide an apparatus for wireless communications. The apparatus generally includes means for transmitting a non-null data packet having a preamble with a VHT-SIG-B field, means for generating an NDP, wherein the VHT-SIG-B field of the preamble of the NDP comprises information, and means for transmitting the NDP.

Certain aspects of the present disclosure provide an apparatus for wireless communications. The apparatus generally includes a transmitter configured to transmit a non-null data packet having a preamble with a VHT-SIG-B field and a processing system configured to generate an NDP, wherein the VHT-SIG-B field of the preamble of the NDP comprises information and wherein the transmitter is further configured to transmit the NDP.

Certain aspects of the present disclosure provide a computer-program product for wireless communications. The computer-program product generally includes a computer-readable medium, which typically includes code for transmitting a non-null data packet having a preamble with a VHT-SIG-B field, generating an NDP, wherein the VHT-SIG-B field of the preamble of the NDP comprises information, and transmitting the NDP.

Certain aspects of the present disclosure provide a method for wireless communications. The method generally includes receiving a non-null data packet having a preamble with a VHT-SIG-B field and receiving an NDP, wherein the VHT-SIG-B field of the preamble of the NDP comprises information.

Certain aspects of the present disclosure provide an apparatus for wireless communications. The apparatus generally includes means for receiving a non-null data packet having a preamble with a VHT-SIG-B field and means for receiving an NDP, wherein the VHT-SIG-B field of the preamble of the NDP comprises information.

Certain aspects of the present disclosure provide an apparatus for wireless communications. The apparatus generally includes a receiver configured to receive a non-null data packet having a preamble with a VHT-SIG-B field and to receive an NDP, wherein the VHT-SIG-B field of the preamble of the NDP comprises information.

Certain aspects of the present disclosure provide a computer-program product for wireless communications. The computer-program product generally includes a computer-readable medium, which typically includes code for receiving a non-null data packet having a preamble with a VHT-SIG-B field and receiving an NDP, wherein the VHT-SIG-B field of the preamble of the NDP comprises information.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
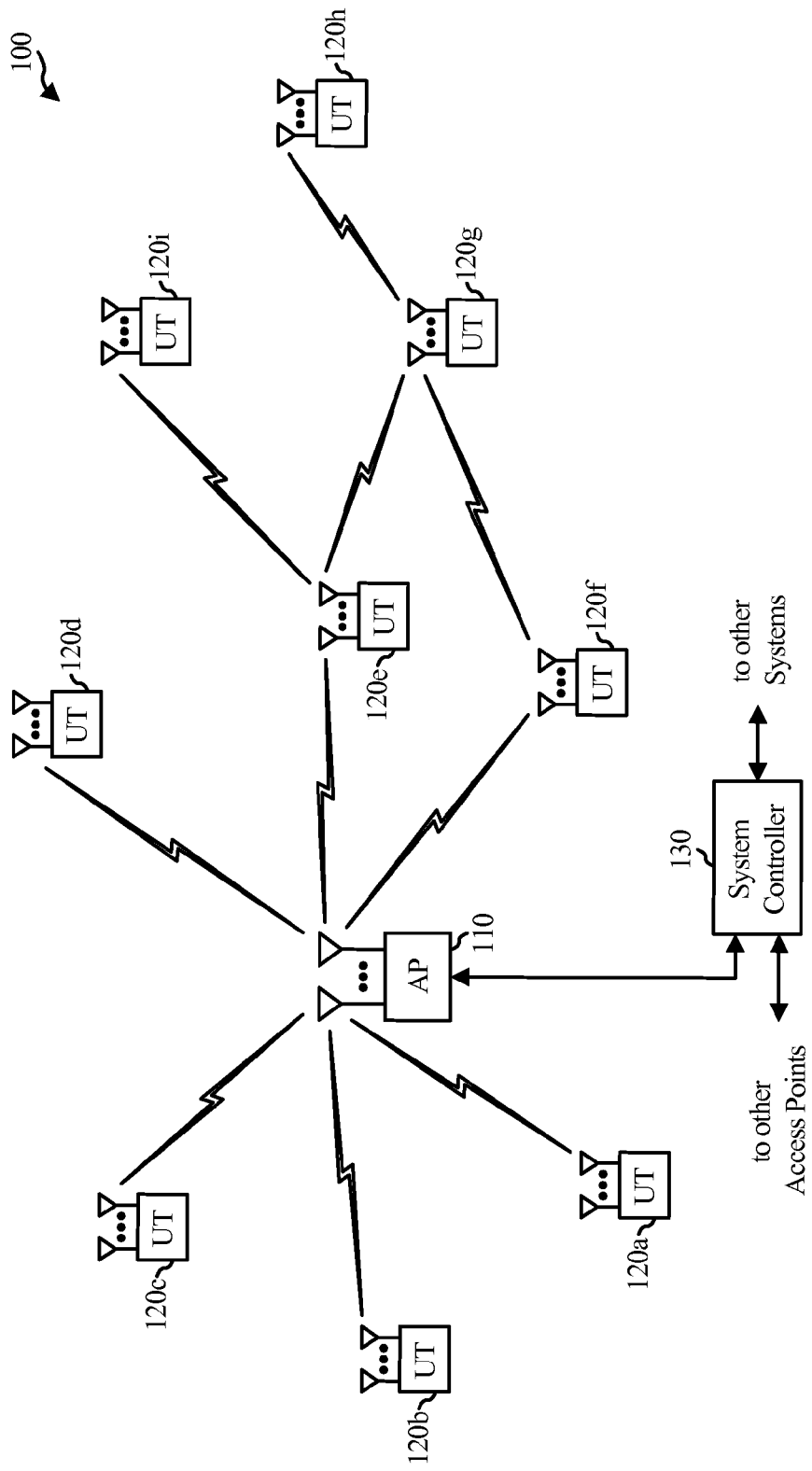
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
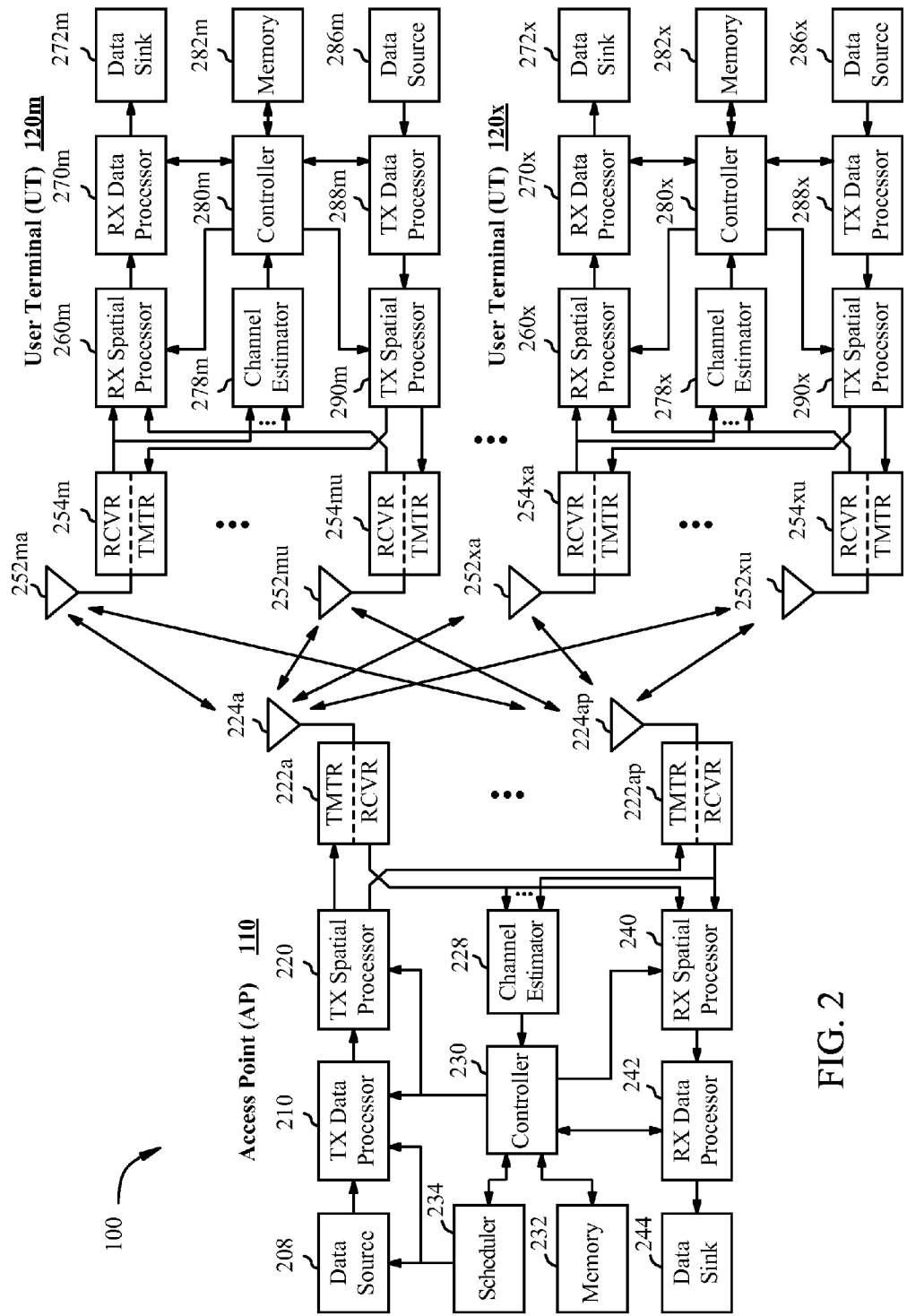
FIG. 2 illustrates a block diagram of an example access point and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
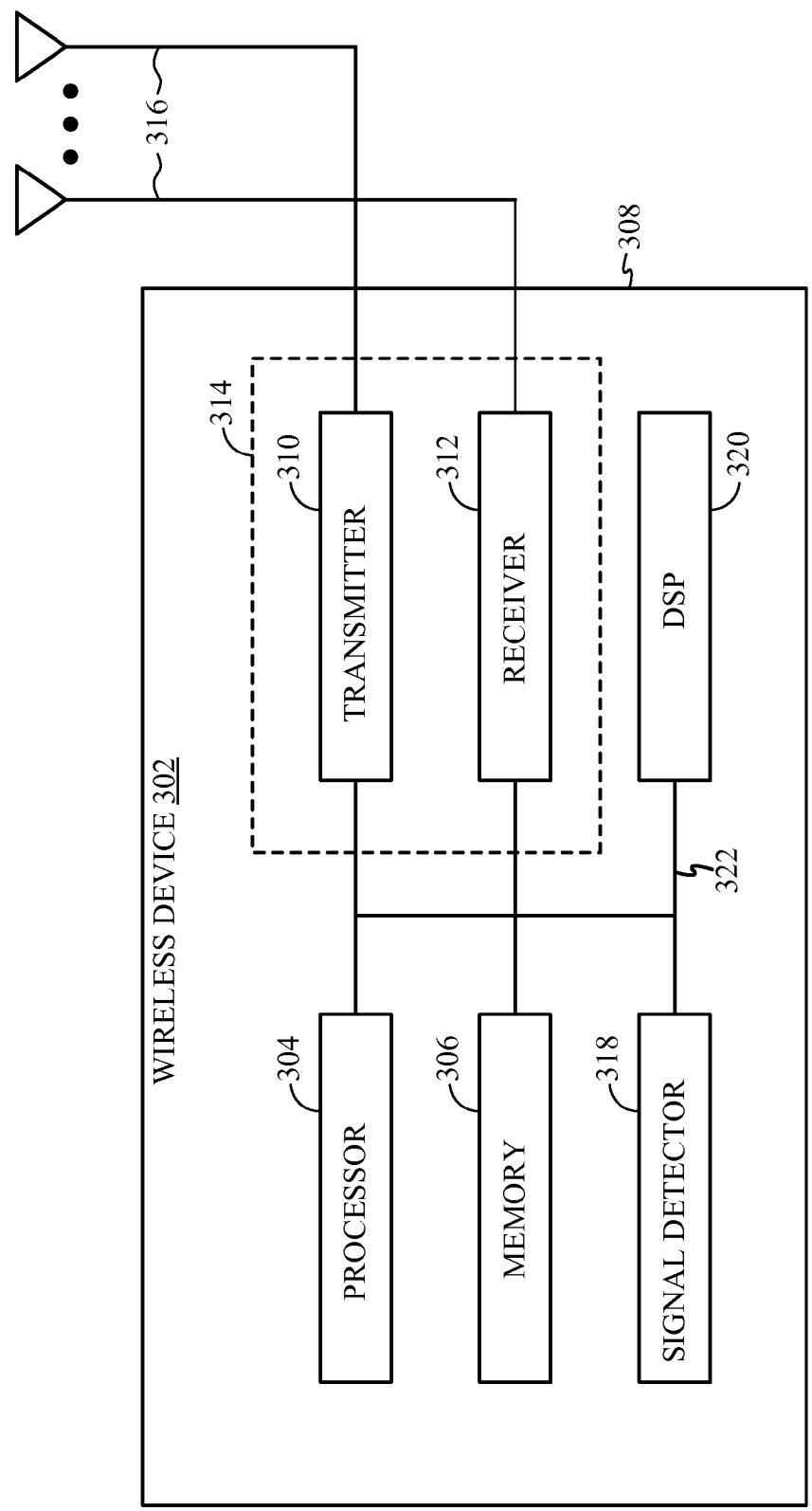
FIG. 3 illustrates a block diagram of an example wireless device in accordance with certain aspects of the present disclosure.

FIG. 3 illustrates various components that may be utilized in a wireless device 302 that may be employed within a wireless communication system (e.g., system 100 of FIG. 1). The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

An Example Preamble Structure

Figure 4:
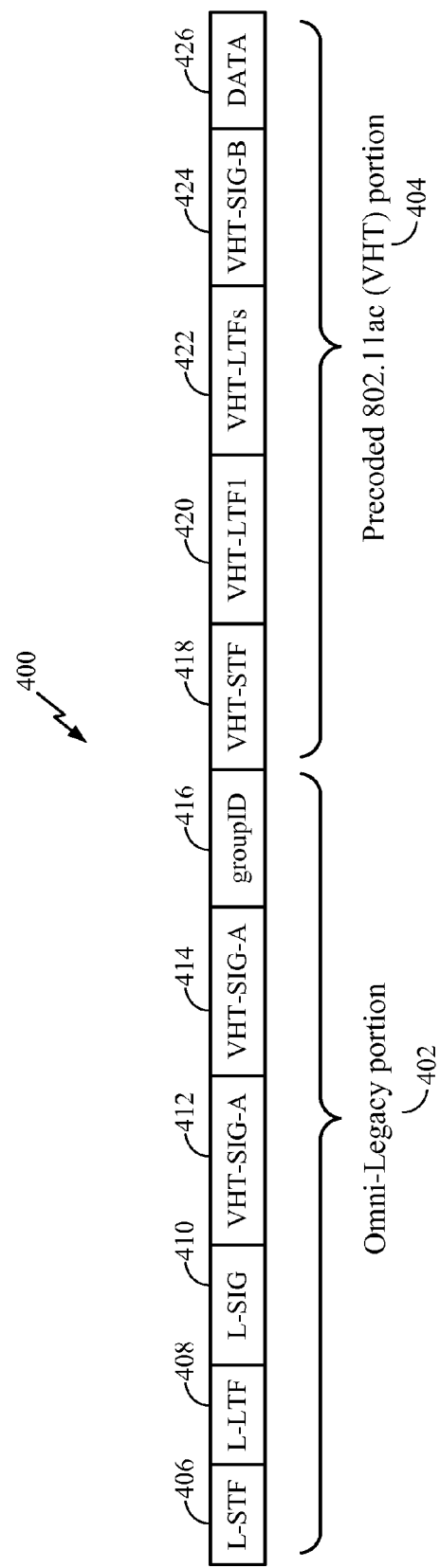
FIG. 4 illustrates an example structure of a preamble transmitted from an access point in accordance with certain aspects of the present disclosure.

FIG. 4 illustrates an example structure of a preamble 400 in accordance with certain aspects of the present disclosure. The preamble 400 may be transmitted, for example, from the access point (AP) 110 to the user terminals 120 in a wireless network (e.g., system 100 illustrated in FIG. 1).

The preamble 400 may comprise an omni-legacy portion 402 (i.e., the non-beamformed portion) and a precoded 802.11ac VHT (Very High Throughput) portion 404. The legacy portion 402 may comprise: a Legacy Short Training Field (L-STF) 406, a Legacy Long Training Field 408, a Legacy Signal (L-SIG) field 410, and two OFDM symbols 412, 414 for VHT Signal A (VHT-SIG-A) fields. The VHT-SIG-A fields 412, 414 may be transmitted omni-directionally and may indicate allocation of numbers of spatial streams to a combination (set) of STAs. For certain aspects, a group identifier (groupID) field 416 may be included in the preamble 400 to convey to all supported STAs that a particular set of STAs will be receiving spatial streams of a MU-MIMO transmission.

The precoded 802.11ac VHT portion 404 may comprise a Very High Throughput Short Training Field (VHT-STF) 418, a Very High Throughput Long Training Field 1 (VHT-LTF1) 420, Very High Throughput Long Training Fields (VHT-LTFs) 422, a Very High Throughput Signal B (VHT-SIG-B) field 424, and a data portion 426. The VHT-SIG-B field may comprise one OFDM symbol and may be transmitted precoded/beamformed.

Robust MU-MIMO reception may involve the AP transmitting all VHT-LTFs 422 to all supported STAs. The VHT-LTFs 422 may allow each STA to estimate a MIMO channel from all AP antennas to the STA's antennas. The STA may utilize the estimated channel to perform effective interference nulling from MU-MIMO streams corresponding to other STAs. To perform robust interference cancellation, each STA may be expected to know which spatial stream belongs to that STA, and which spatial streams belong to other users.

An Example VHT-SIG-B Field in NDPs

As described above, groups may be formed in DL MU-MIMO transmission for WLANs for conveying the spatial stream positions to STAs. For IEEE 802.11ac, the Group ID may be set to zero for NDPs (Null Data Packets), making it a single user (SU) packet. Given that there is no data in an NDP, the Length field (e.g., in the L-SIG field 410) may be set to zero and a few reserved bits may be set to one. Proposals to remove the VHT-SIG-B field from the preamble for NDPs have been entertained.

However, there are ways of utilizing the VHT-SIG-B field in NDPs, as described below. Various advantages of retaining the VHT-SIG-B field in NDPs may include:

retaining a unified IEEE 802.11ac preamble structure;
giving 4 µs extra time to process beamforming feedback; and
using information in the VHT-SIG-B field to determine a level of interference in the NDP.

For certain aspects, a VHT packet may be determined to be an NDP by checking for the proper length indication in the L-SIG field 410. First, L_LENGTH may be defined to be $(3+N_{VHT\text{-}LTF}+1)*3-3$ for VHT NDPs. Then, the receiver may check whether the length indicated in the L-SIG field 410 equals L_LENGTH to determine that a received packet is an NDP.

The content of the VHT-SIG-B field in an NDP may be selected from one or a combination of various options. Some of these are described below.

Option 1

For certain aspects, the content of the VHT-SIG-B field 424 for an NDP may comprise at least a portion of a repeated VHT-LTF symbol. This VHT-LTF symbol may be repeated from the content in either of the VHT-LTFs 420, 422 in the preamble 400. For certain aspects, the repeated VHT-LTF symbol may be used to slightly increase the accuracy of the channel state information (CSI) for feedback. For other aspects, the repeated VHT-LTF symbol may be used to correct for residual frequency offset.

Option 2

For certain aspects, the content of the VHT-SIG-B field 424 for an NDP may comprise a dedicated bit pattern. This option may be the least complex of the four options provided in this disclosure. In this case, a CRC (Cyclic Redundancy Check) need not be performed because the check on the bit pattern itself provides enough robustness.

For certain aspects, the dedicated bit pattern used may have the same content as VHT-SIG-B fields of normal, non-null SU VHT PPDUs (physical layer conversion protocol (PLCP) protocol data units). For NDPs, the Length field (e.g., in the L-SIG field 410) will be zero. However, one disadvantage of this technique is the high peak-to-average-power ratio (PAPR) of VHT-SIG-B with a Length field set to 0. For example, when using a four times oversampled IFFT (inverse fast Fourier transform) with this technique, the PAPR may equal 12.06 dB (20 MHz), 15.21 dB (40 MHz), or 15.72 dB (80 MHz).

For other aspects, the dedicated bit pattern may comprise the 20/21/23 useful VHT-SIG-B bits for 20/40/80 MHz channels and may, for example, be selected to have a low PAPR.

The following sequences (showing Least Significant Bit (LSB) first) may result in the lowest PAPR when using a four times oversampled IFFT:

20 MHz: 0 0 0 0 0 1 1 1 0 1 0 0 0 1 0 0 0 0 1 0 (PAPR=3.16 dB)

40 MHz: 1 0 1 0 0 1 0 1 1 0 1 0 0 0 1 0 0 0 0 1 1 (PAPR=5.42 dB)

80 MHz: 0 1 0 1 0 0 1 1 0 0 1 0 1 1 1 1 1 1 0 0 1 0 (PAPR=5.13 dB)

For other aspects, the dedicated bit pattern may comprise the 20/21/23 useful VHT-SIG-B bits for 20/40/80 MHz channels and may, for example, be selected to have a low PAPR, but a portion (e.g., the first portion) of the bits may always be the same. For example, the first 20 bits of the bit pattern for the VHT-SIG-B field may be equal.

The following bit sequences (showing LSB first) may result in the lowest PAPR with the first 20 bits reused, when using a four times oversampled IFFT:

20 MHz: 1 0 0 0 0 0 1 1 1 0 0 1 1 0 1 1 1 1 0 1 (PAPR=4.94 dB)

40 MHz: 1 0 0 0 0 0 1 1 1 0 0 1 1 0 1 1 1 1 0 1 1 (PAPR=5.97 dB)

80 MHz: 1 0 0 0 0 0 1 1 1 0 0 1 1 0 1 1 1 1 0 1 0 0 1 (PAPR=6.08 dB)

Option 3

For certain aspects, the content of the VHT-SIG-B field 424 for an NDP may comprise at least a portion of a Basic Service Set identifier (BSSID). For example, the VHT-SIG-B field may comprise the 20/21/23 LSBs of the BSSID for 20/40/80 MHz channels. Using a portion of the BSSID in the VHT-SIG-B for NDPs may provide a means to check that the NDP comes from the correct BSSID. With this option, a CRC need not be performed because the check on the LSBs of the BSSID provides enough robustness.

Option 4

For certain aspects, the content of the VHT-SIG-B field 424 for an NDP may comprise an NDP sequence number. For certain aspects, a portion of the VHT-SIG-B field may comprise an NDP sequence number, and a remaining portion may comprise a number of bits (e.g., LSBs) of the BSSID. This option may provide a means to check that the NDP comes from the correct BSSID and that the NDP has the correct sequence number. With this option, a CRC need not be performed because the check on the NDP sequence number and the LSBs (or other bits) of the BSSID provides enough robustness.

For certain aspects, dedicated information may be added, at a transmitting entity (e.g., an AP 110), in the VHT-SIG-B field 424 of a VHT-NDP according to one or more of the above four options. For certain aspects, the dedicated information in the VHT-SIG-B of the VHT-NDP may be processed at a receiving entity (e.g., a user terminal 120) to determine a level of interference. In an aspect, depending on the level of interference, the receiving entity may decide to either: (1) alter the beamforming feedback (such as CSI feedback or (un)compressed beamforming matrix feedback) and transmit the altered beamforming feedback or (2) to not send back beamforming feedback at all.

Figure 5:
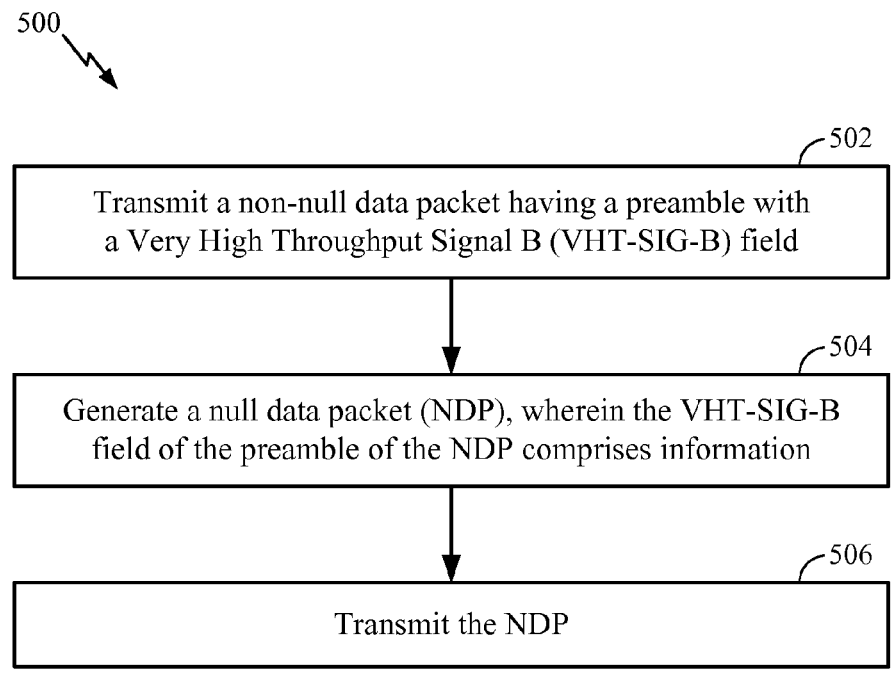
FIG. 5 illustrates example operations that may be performed at an access point (AP) to generate a null data packet (NDP) with a VHT-SIG-B field in the preamble of the NDP including information, in accordance with certain aspects of the present disclosure.

FIG. 5 illustrates example operations 500 that may be performed at an access point (AP), for example, to generate a null data packet (NDP) with a VHT-SIG-B field in the preamble of the NDP including information, in accordance with certain aspects of the present disclosure. The operations 500 may begin, at 502, by transmitting a non-null data packet having a preamble with a VHT-SIG-B field. At 504, a null data packet (NDP) may be generated, wherein the VHT-SIG-B field of the preamble of the NDP comprises information. Such information in the VHT-SIG-B field may be used by a user terminal receiving the information, as opposed to reserved bits set to 1 for conventional NDPs, which does not include any useful information. At 506, the NDP may be transmitted.

Figure 6:
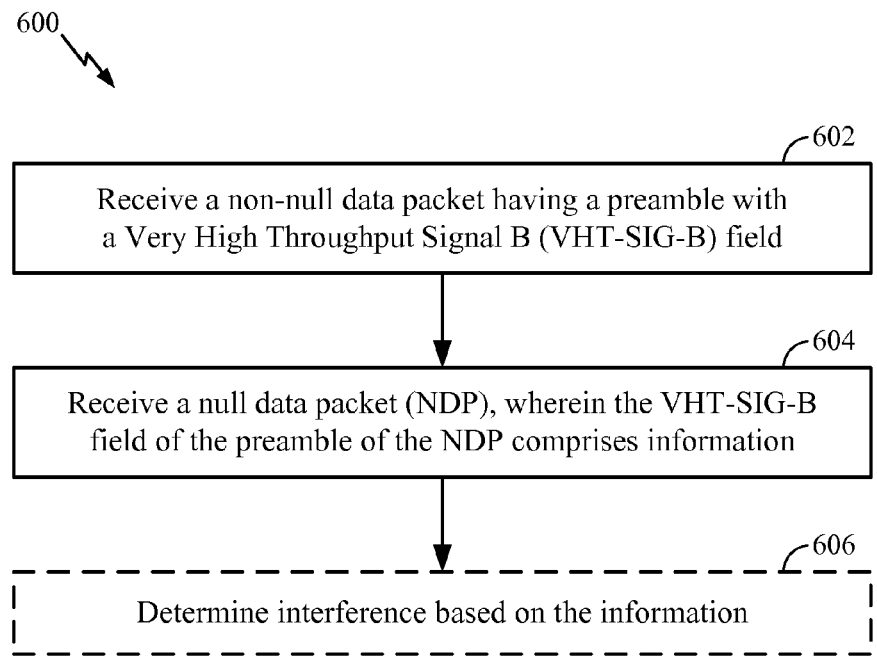
FIG. 6 illustrates example operations that may be performed at a user terminal (UT) to receive an NDP with a VHT-SIG-B field in the preamble of the NDP including information, in accordance with certain aspects of the present disclosure.

FIG. 6 illustrates example operations 600 that may be performed at a user terminal, for example, to receive an NDP with a VHT-SIG-B field in the preamble of the NDP including information, in accordance with certain aspects of the present disclosure. The operations 600 may begin, at 602, by receiving a non-null data packet having a preamble with a VHT-SIG-B field. At 604, an NDP may be received, wherein the VHT-SIG-B field of the preamble of the NDP includes information. Optionally, for certain aspects at 606, interference may be determined based on the information.

Figure 5A:
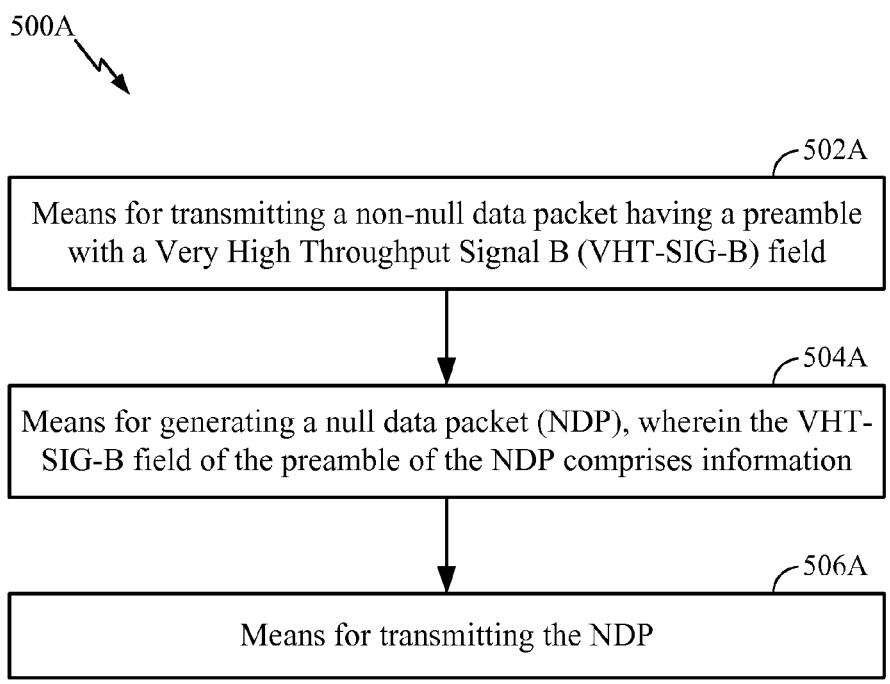
FIG. 5A illustrates example means capable of performing the operations shown in FIG. 5.
Figure 6A:
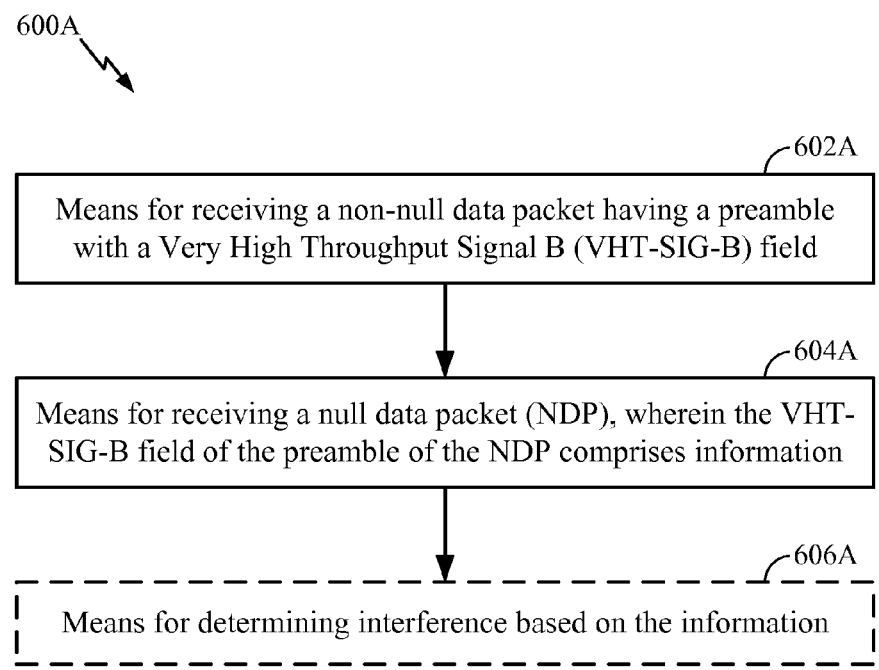
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 illustrated in FIG. 5 correspond to means 500A illustrated in FIG. 5A, and operations 600 illustrated in FIG. 6 correspond to means 600A illustrated in FIG. 6A.

For example, means for transmitting may comprise a transmitter, such as the transmitter unit 222 of the access point 110 illustrated in FIG. 2, the transmitter unit 254 of the user terminal 120 depicted in FIG. 2, or the transmitter 310 of the wireless device 302 shown in FIG. 3. Means for receiving may comprise a receiver, such as the receiver unit 222 of the access point 110 illustrated in FIG. 2, the receiver unit 254 of the user terminal 120 depicted in FIG. 2, or the receiver 312 of the wireless device 302 shown in FIG. 3. Means for processing, means for determining, means for altering, means for generating, means for correcting, and/or means for checking may comprise a processing system, which may include one or more processors, such as the RX data processor 270 and/or the controller 280 of the user terminal 120 or the RX data processor 242 and/or the controller 230 of the access point 110 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM, or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
    transmitting a non-null data packet having a preamble with a Very High Throughput Signal B (VHT-SIG-B) field;
    generating a null data packet (NDP), wherein the VHT-SIG-B field of the preamble of the NDP comprises a particular bit pattern; and
    transmitting the NDP, wherein transmitting the NDP comprises using a 20 MHz channel and the particular bit pattern comprises 20 bits comprising 0 0 0 0 0 1 1 1 0 1 0 0 0 1 0 0 0 0 1 0, using a 40 MHz channel and the particular bit pattern comprises 21 bits comprising 1 0 1 0 0 1 0 1 1 0 1 0 0 0 1 0 0 0 0 1 1, or using an 80 MHz channel and the particular pattern comprises 23 bits comprising 0 1 0 1 0 0 1 1 0 0 1 0 1 1 1 1 1 1 1 0 0 1 0.

2. The method of claim 1, wherein the particular bit pattern is selected to have a low peak-to-average-power ratio (PAPR).

3. An apparatus for wireless communications, comprising:
    means for transmitting a non-null data packet having a preamble with a Very High Throughput Signal B (VHT-SIG-B) field;
    means for generating a null data packet (NDP), wherein the VHT-SIG-B field of the preamble of the NDP comprises a particular bit pattern; and
    means for transmitting the NDP, wherein transmitting the NDP comprises using a 20 MHz channel and the particular bit pattern comprises 20 bits comprising 0 0 0 0 0 1 1 1 0 1 0 0 0 1 0 0 0 0 1 0, using a 40 MHz channel and the particular bit pattern comprises 21 bits comprising 1 0 1 0 0 1 0 1 1 0 1 0 0 0 1 0 0 0 0 1 1, or using an 80 MHz channel and the particular pattern comprises 23 bits comprising 0 1 0 1 0 0 1 1 0 0 1 0 1 1 1 1 1 1 1 0 0 1 0.

4. An apparatus for wireless communications, comprising:
    a transmitter configured to transmit a non-null data packet having a preamble with a Very High Throughput Signal B (VHT-SIG-B) field; and
    a processing system configured to generate a null data packet (NDP), wherein the VHT-SIG-B field of the preamble of the NDP comprises a particular bit pattern and wherein the transmitter is further configured to transmit the NDP, wherein transmitting the NDP comprises using a 20 MHz channel and the particular bit pattern comprises 20 bits comprising 0 0 0 0 0 1 1 1 0 1 0 0 0 1 0 0 0 0 1 0, using a 40 MHz channel and the particular bit pattern comprises 21 bits comprising 1 0 1 0 0 1 0 1 1 0 1 0 0 0 1 0 0 0 0 1 1, or using an 80 MHz channel and the particular pattern comprises 23 bits comprising 0 1 0 1 0 0 1 0 1 1 1 1 1 1 1 0 0 1 0.

5. The apparatus of claim 4, wherein the particular bit pattern is selected to have a low peak-to-average-power ratio (PAPR).

6. A computer-program product for wireless communications, the computer-program product comprising:
 a non-transitory computer-readable medium comprising code for:
  transmitting a non-null data packet having a preamble with a Very High Throughput Signal B (VHT-SIG-B) field;
  generating a null data packet (NDP), wherein the VHT-SIG-B field of the preamble of the NDP comprises a particular bit pattern; and
  transmitting the NDP, wherein transmitting the NDP comprises using a 20 MHz channel and the particular bit pattern comprises 20 bits comprising 0 0 0 0 0 1 1 1 0 1 0 0 0 1 0 0 0 0 1 0, using a 40 MHz channel and the particular bit pattern comprises 21 bits comprising 1 0 1 0 0 1 0 1 1 0 1 0 0 0 1 0 0 0 0 1 1, or using an 80 MHz channel and the particular pattern comprises 23 bits comprising 0 1 0 1 0 0 1 1 0 0 1 0 1 1 1 1 1 1 1 0 0 1 0.

7. A method for wireless communications, comprising:
 receiving a non-null data packet having a preamble with a Very High Throughput Signal B (VHT-SIG-B) field; and
 receiving a null data packet (NDP), wherein the VHT-SIG-B field of the preamble of the NDP comprises information and wherein the information comprises a particular bit pattern, wherein receiving the NDP comprises receiving the NDP via a 20 MHz channel and the particular bit pattern comprises 20 bits comprising 0 0 0 0 0 1 1 1 0 1 0 0 0 1 0 0 0 0 1 0, receiving the NDP via a 40 MHz channel and the particular bit pattern comprises 21 bits comprising 1 0 1 0 0 1 0 1 1 0 1 0 0 0 1 0 0 0 0 1 1, or receiving the NDP via an 80 MHz channel and the particular bit pattern comprises 23 bits comprising 0 1 0 1 0 0 1 1 0 0 1 0 1 1 1 1 1 1 1 0 0 1 0.

8. The method of claim 7, further comprising determining interference based on the information.

9. The method of claim 8, further comprising:
 altering beamforming feedback based on the interference; and
 transmitting the altered beamforming feedback.

10. The method of claim 7, wherein the particular bit pattern has a low peak-to-average-power ratio (PAPR).

11. The method of claim 7, further comprising checking that the particular bit pattern of the received NDP is correct.

12. An apparatus for wireless communications, comprising:
 means for receiving a non-null data packet having a preamble with a Very High Throughput Signal B (VHT-SIG-B) field; and
 means for receiving a null data packet (NDP), wherein the VHT-SIG-B field of the preamble of the NDP comprises information and wherein the information comprises a particular bit pattern, wherein receiving the NDP comprises receiving the NDP via a 20 MHz channel and the particular bit pattern comprises 20 bits comprising 0 0 0 0 0 1 1 1 0 1 0 0 0 1 0 0 0 0 1 0, receiving the NDP via a 40 MHz channel and the particular bit pattern comprises 21 bits comprising 1 0 1 0 0 1 0 1 1 0 1 0 0 0 1 0 0 0 0 1 1, or receiving the NDP via an 80 MHz channel and the particular bit pattern comprises 23 bits comprising 0 1 0 1 0 0 1 1 0 0 1 0 1 1 1 1 1 1 1 0 0 1 0.

13. An apparatus for wireless communications, comprising:
 a receiver configured to:
  receive a non-null data packet having a preamble with a Very High Throughput Signal B (VHT-SIG-B) field; and
  receive a null data packet (NDP), wherein the VHT-SIG-B field of the preamble of the NDP comprises information and wherein the information comprises a particular bit pattern, wherein receiving the NDP comprises receiving the NDP via a 20 MHz channel and the particular bit pattern comprises 20 bits comprising 0 0 0 0 0 1 1 1 0 1 0 0 0 1 0 0 0 0 1 0, receiving the NDP via a 40 MHz channel and the particular bit pattern comprises 21 bits comprising 1 0 1 0 0 1 0 1 1 0 1 0 0 0 1 0 0 0 0 1 1, or receiving the NDP via an 80 MHz channel and the particular bit pattern comprises 23 bits comprising 0 1 0 1 0 0 1 1 0 0 1 0 1 1 1 1 1 1 1 0 0 1 0.

14. The apparatus of claim 13, further comprising a processing system configured to determine interference based on the information.

15. The apparatus of claim 14, further comprising a transmitter, wherein the processing system is further configured to alter beamforming feedback based on the interference and wherein the transmitter is configured to transmit the altered beamforming feedback.

16. The apparatus of claim 13, wherein the particular bit pattern has a low peak-to-average-power ratio (PAPR).

17. The apparatus of claim 13, further comprising a processing system configured to check that the particular bit pattern of the received NDP is correct.

18. A computer-program product for wireless communications, the computer-program product comprising:
 a non-transitory computer-readable medium comprising code for:
  receiving a non-null data packet having a preamble with a Very High Throughput Signal B (VHT-SIG-B) field; and
  receiving a null data packet (NDP), wherein the VHT-SIG-B field of the preamble of the NDP comprises information and wherein the information comprises a particular bit pattern, wherein receiving the NDP comprises receiving the NDP via a 20 MHz channel and the particular bit pattern comprises 20 bits comprising 0 0 0 0 0 1 1 1 0 1 0 0 0 1 0 0 0 0 1 0, receiving the NDP via a 40 MHz channel and the particular bit pattern comprises 21 bits comprising 1 0 1 0 0 1 0 1 1 0 1 0 0 0 1 0 0 0 0 1 1, or receiving the NDP via an 80 MHz channel and the particular bit pattern comprises 23 bits comprising 0 1 0 1 0 0 1 1 0 0 1 0 1 1 1 1 1 1 1 0 0 1 0.

* * * * *